United States Patent [19]

Iseler et al.

[11] 4,260,538

[45] Apr. 7, 1981

[54] MATURED MOLDABLE THERMOSETTING DUAL POLYESTER RESIN SYSTEM

[75] Inventors: Kenneth A. Iseler, Richmond; Mayur S. Shah, Sterling Heights, both of Mich.

[73] Assignee: The Budd Company, Troy, Mich.

[21] Appl. No.: 79,272

[22] Filed: Sep. 27, 1979

[51] Int. Cl.$^3$ .......................... C08K 3/22; C08L 67/06
[52] U.S. Cl. .................................... 260/40 R; 525/19; 525/28; 525/36; 525/42; 525/49; 260/40 TN
[58] Field of Search ........................ 260/40 R, 40 TN; 525/19, 28, 36, 49

[56] References Cited

U.S. PATENT DOCUMENTS

| | | | |
|---|---|---|---|
| 3,824,201 | 7/1974 | McGranaghan et al. | 525/28 |
| 3,886,229 | 5/1975 | Hutchinson et al. | 525/28 |
| 4,067,845 | 1/1978 | Epel et al. | 260/40 R |

*Primary Examiner*—Carman J. Seccuro
*Attorney, Agent, or Firm*—A. L. Trueax, Jr.

[57] ABSTRACT

This invention relates to an improved, matured, moldabe, thermosetting polyester resin system which includes at least two different polyester resins, one of which is faster reactive and containing a minor amount of isophthalic acid and the other of which is slower reactive and devoid of such acid, such system also including suitabe reinforcing fibers and inert filler along with an organic polyisocyanate, a metallic oxide or hydroxide, an aliphatically-unsaturated monomer, a free radical polymerization catalyst, and an internal mold release agent, the resin system being especially useful for pressure molding of precisely-formed articles having greatly improved impact resistance and flexibility.

29 Claims, No Drawings

MATURED MOLDABLE THERMOSETTING DUAL POLYESTER RESIN SYSTEM

BACKGROUND OF THE INVENTION

1. Field of the Invention

The present invention relates to maturated, unsaturated polyester resin molding compositions or compounds which are especially useful for making reinforced plastic articles in molding apparatus having heated surfaces utilizing such molding compositions.

2. Description of the Prior Art

Unsaturated polyester resin compositions are extensively used in modern industry for the manufacture of precisely-formed, durable articles of many types. Such compositions include an ethylenically unsaturated polyester resin which is the polyesterification reaction product of polyhydric alcohols and polycarboxylic compounds such as polycarboxylic acids or polycarboxylic acid anhydrides wherein at least a portion of the polycarboxylic compounds contain ethylenic unsaturation. The unsaturated polyester resin is combined with suitable cross-linking compounds having a terminal $$>C=CH_2$$

radical. In order to fill the needs of high-speed efficient manufacturing processes, it is required that such compositions be rapidly cured in most applications to minimize process curing time. Rapid curing compositions are particularly desirable where the unsaturated polyester resin or resins are combined with essentially inert fillers which usually include fibrous reinforcement to form molding compounds having desired chemical and physical properties. Such molding compounds are commercially used in conjunction with matched metal dies which are frequently operated at elevated temperatures and pressures in making intricately-shaped articles.

Polymerizable polyacrylates of polyepoxides are known in the art as being capable of homopolymerization and of copolymerization with unsaturated polyesters as disclosed in U.S. Pat. Nos. 3,256,226, 3,301,743 and 3,317,465.

Unsaturated polyester resin compositions are prepared by reacting polyhydric compounds with polycarboxylic compounds under esterification conditions. The polycarboxylic compounds may be polycarboxylic acids or acid anhydrides as long as a substantial portion of the selected polycarboxylic compound contains ethylenic unsaturation.

Typical polyhydric compounds include ethylene glycol, polyethylene glycol, propylene glycol, poly propylene glycol, butylene glycol, polybutylene glycol, and the like. Typical carboxylic compounds include phthalic acid, phthalic anhydride, isophthalic acid, terephthalic acid, adipic acid, oxalic acid, endomethylene tetrahydrophthalic anhydride, endomethylene tetrahydrophthalic acid, hexachloroendomethylene tetrahydrophthalic anhydride, maleic acid, maleic anhydride, fumaric acid, itaconic acid, citraconic acid, and the like.

The resulting polyester resin is normally dissolved in a suitable unsaturated cross-linking monomer containing terminal $CH_2=CH$-groups, such as styrene, vinyl toluene, divinyl benzene, methylmethacrylate, ethylmethacrylate, methylacrylate, ethylacrylate, acrylic acid, methacrylic acid, diallyl phthalate, triallyl cyanurate, orthochlorostyrene, and the like.

Usually the unsaturated polyester resin composition contains a suitable polymerization inhibitor such as hydroquinone, quinone, alkyl phenols, and the like, to prevent premature gelation. The materials are cured to a hardened thermoset condition by the addition of suitable free radical polymerization initiators such as organic peroxy compounds such as tertiary butyl perbenzoate, benzoyl peroxide, dicumyl peroxide, and the like. The catalyzed resin compositions are normally heated to obtain more rapid curing.

In the past, molding compositions have been frequently formulated containing from about 15 to 55 parts by weight of the unsaturated polyester resin composition and from about 85 to 45 parts by weight of essentially inert fillers and/or reinforcing fibers including carbonates, silicates, clays, glass fibers, mineral fibers, pigments, and the like. The molding compositions also frequently contain a small quantity of a mold release agent.

Previously, it has been found that the cure time required for making molded articles from unsaturated polyester resin molding compositions could be lowered to commercially desirable periods without adversely affecting the quality of the cured resinous products. This was achieved in molding apparatus having heated molding surfaces by incorporating into conventional molding compositions from about 0.01 to 0.20 parts by weight of a polyacrylate based on the weight of the unsaturated polyesters in the composition. The polyacrylate is the reaction product of a polyepoxide and an ethylenically-unsaturated carboxylic acid which may be methacrylic acid or acrylic acid. The polyepoxide and carboxylic acid are combined in stoichiometric proportions to provide about 1 mole of the acid for each epoxide group. The cure time for articles molded with the stated amount of polyacrylates of polyepoxides is less than about one-half that required for molding compositions containing the identical unsaturated polyester resins without the polyacrylates of polyepoxides. Such improvement is disclosed by U.S. Pat. No. 3,621,093 to Svoboda et al., entitled, "Process For Making Reinforced Thermoset Articles", issued Nov. 16, 1971.

The concept of improving the viscosity temperature dependence of maturated moldable unsaturated polyester resin systems using dual thickening agents consisting of an oxide or hydroxide of magnesium or calcium and a polyisocyanate is known in the art. Such dual thickening system provides a greatly-improved viscosity index resulting in a lesser viscosity decrease with increase in temperature as encountered in conventional heat and pressure molding of precision parts. Such improvement is disclosed by U.S. Pat. No. 4,067,845 to Epel et al., entitled, "Maturation of Polyester Compositions For Viscosity Index Control", which patent is assigned to the same common assignee as the present application.

SUMMARY OF THE INVENTION

The present invention relates to an improved maturated moldable thermosetting polyester resin system which includes at least two different polyester resins, one of which is faster reactive, has an acid number of about 20 to 30, and contains a minor amount of isophthalic acid, and the other of which is slower reactive, has an acid number of about 8 to 17, and is devoid of such isophthalic acid. The composition also includes suitable reinforcing fibers, a thermoplastic additive, and an inert filler along with an organic polyisocyanate, a metallic oxide or hydroxide such as calcium and magnesium oxides, or hydroxides, an aliphatically unsaturated monomer, a free radical polymerization catalyst, and an internal mold release agent. The molding composition is particularly valuable for pressure molding using molds having heated surfaces in forming precisely-contoured articles or component parts having markedly improved impact resistance and greater flexibility. The articles or parts are capable of being formed having thinner cross-sections for weight and cost savings. The molding compositions are especially useful as a sheet molding compound for forming large parts or articles having lesser thickness per unit weight with greater flexibility without sacrificing molding or surface quality. Molded panels have about 25 percent greater flexibility than previously known polyester resin sheet molding compounds (SMC). Also such panels have been found capable of absorbing approximately 55 percent more energy on impact over known sheet molding compounds.

DESCRIPTION OF THE PREFERRED EMBODIMENT

The manufacture of reinforced molded articles using molding equipment having heated molding surfaces can be significantly improved by application of the present molding compounds. In such molding processes, a suitable molding composition, normally called a bulk molding compound or a sheet molding compound depending upon the characteristics of the articles to be molded, is introduced into a molding apparatus having heated molding surfaces, i.e. matched metal dies or molds having a hollow cavity subject to increased pressure or a heated metal die or orifice from which the newly-formed sheet material may be pulled by a pultrusion process. The molding composition containing the selected polyester resins, and fibrous and inert fillers is retained, within the molding apparatus at a temperature of about 150° to 500° F. and subjected to increased pressure for a molding period which is determined by experience, taking into consideration the precise proportions of the molding composition, the size and intricacy of the ultimately molded article, the cycling characteristics of the molding apparatus, mold heating capacity and other factors known in the thermoset plastic molding art. After a suitable molding period, the molding composition is separated from the heated molding surfaces and is recovered as a cured thermoset plastic article having the desired physical characteristics.

The present invention encompasses a maturated moldable thermosetting resin-containing composition for molding under pressure at an elevated temperature by the several processes referenced hereinabove.

The thermosetting composition consists essentially of the following ingredients (A) a faster-reactive first polyester resin having an acid number of about 20 to 30 and containing a minor amount of isophthalic acid, (B) a slower-reactive second polyester resin having an acid number ranging from about 8 to 17 and being devoid of such isophthalic acid, (C) a single or dual thickening system, (D) an aliphatically unsaturated monomer, (E) a free radical polymerization catalyst, (F) an internal mold release agent, and either or both of (G) reinforcing fibers and (H) inert fillers, and may in addition contain (I) a thermoplastic additive to produce molding compositions with low-shrink characteristics, (J) toughener additives, and (K) pigments. In the present composition ingredients (K), (G), (H) and (I) are optional but ususal components, whereas (J) is also optional component. The ingredients (A), (B) and (C), containing dispersed therein ingredients (D), (E) and (F), constitute the curable resin binder which generally comprises at least about eight percent and normally at least about ten percent, of the total weight of the composition.

(A) FASTER-REACTIVE UNSATURATED POLYESTER RESIN

The unsaturated first polyester resin (A) is a faster-reactive glycol maleate type which has (1) a ratio of hydroxyl groups to carbonyl groups between about 5.7 and 0.8, and (2) an acid number of at least 18 and (3) an average molecular weight between about 800 and 5,000, and preferably between about 1100 and 2200 as measured by End Group Analysis. The resin preferably has an acid number of about 24, and a hydroxyl number of at least 24, preferably 24 to 120. The resinous condensation product is ordinarily dissolved in an aliphatically unsaturated monomer such as styrene (reactant (D) herein) prior to use in the composition of the invention.

Highly-reactive unsaturated polyester resin (A) is preferably comprised of a product having a Budd designation of 2040 formulated and sold by Budd Chemical Corporation of Port Washington, Wis. Such product is an acidified polymerizable mixture of (1) a styrene solution of an unsaturated first polyester resin formed from (a) glycols including diethylene glycol and propylene glycol, and (b) dicarboxylic acids (or anhydrides) including maleic amphydride, isophthalic acid, and adipic acid, and, (2) one-half of one percent of a styrene solution of the dimethacrylate of a Bisphenol-A diepoxy resin, i.e., the dimethyacrylate formed by reacting methacrylic acid with the diepoxy resin

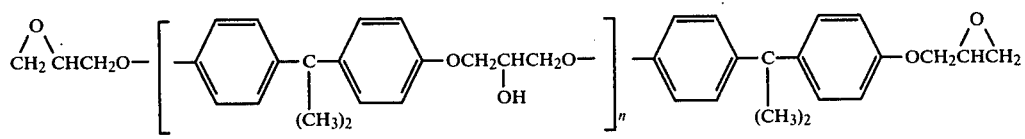

wherein n is greater than 0.2.

Budd 2040 has the following typical characteristics:

| | |
|---|---|
| Acid No. | 18-27 |
| Non-volatile Matter | 61-67% |
| Viscosity (77° F.) | 275 to 500 cps |
| SPI Gel Time (180° F.) | 7.0 minutes |
| Time to Peak | 8.7 minutes |
| Peak Exotherm | 430° F. |

(B) SLOWER-REACTIVE UNSATURATED POLYESTER RESIN

The unsaturated second polyester resin (B) is a slower-reactive glycol maleate/fumaric type which has (1) a ratio of hydroxyl groups to carboxyl groups between about 5.7 and 0.8, and (2) an acid number ranging from about 8 to 17 and (3) an average molecular weight between about 800 and 5000, and preferably between about 800 and 1000 as measured by Vapor Phase Osmometry. The resin has a hydroxyl number of at least 14, preferably 14 to 120. The resinuous condensation product is ordinarily dissolved in an aliphatically unsaturated monomer such as styrene (reactant (D) herein) prior to use in the composition of the invention.

The slower reactive unsaturated second polyester resin (B) is preferably comprised of a product having a Budd designation of 2030 formulated and sold by Koppers Company, Inc., Pittsburgh, Pa., which is made of an unsaturated polyester resin component and a cross-linking monomer component. The unsaturated polyester component has the following chemical ingredients: 1.11 moles maleic/fumaric acid, 0.64 moles adipic acid and 1.93 moles propylene glycol. The unsaturated polyester resin comprises from 65.0 to 67.0 percent by weight of the polyester resin composition. The cross-linking monomer is styrene which comprises from about 33.0 to 35.0 percent by weight of the composition. The composition also contains 0.09 percent by weight of dimethyl formamide.

Budd 2030 has the following typical characteristics:

| | |
|---|---|
| Viscosity (77° F.), cps | 250–300 |
| Acid Number | 8–17 |
| Non-volatile Matter | 63–68% |
| SPI Data (180° F.) | |
| Gel, minutes | 12–18 |
| Cure, minutes | 14–20 |
| Peak, (°F.) | 392–410 |

Although other unsaturated polyesters may be employed as starting materials according to the present invention, the above two types are of special utility in a preferred teaching of the invention. The said two polyester resins can be combined in a preferred ratio of 50—50 weight percent in the present invention along with the following other constituents, although ranges varying from about 30–70 to 70–30 weight percent are also employed.

ORGANIC POLYISOCYANATE (C) (1)

The organic polyisocyanate is employed in an amount sufficient to react with at least thirty percent but not more than one hundred five percent of the hydroxyl groups present in the reaction. The polyisocyanate (C) (1) is preferably 4, 4'-diphenylmethane diisocyanate (MDI) or a mixture of MDI and its trifunctional cyclic adduct containing carbodiimide linkages. The exact polyisocyanate employed is not critical, but diisocyanates are preferred. Common representative polyisocyanates include: toluene-2, 4-diisocyanate, toluene-2, 6-diisocyanate, commercial mixtures of 2, 4- and 2, 6-toluene diisocyanate, the meta- and para-phenyl diisocyanates, 1, 5-naphthalene diisocyanate, para- and meta-xylylene diisocyanates, the alkylene diisocyanates such as tetramethylene diisocyanate and hexamethylene diisocyanate, 2, 4- and 2, 6-diisocyanato methylcyclohexane, dicyclohexylmethane diisocyanate, and polymeric MDI containing an average of from two to three isocyanate groups per molecule. Other polyisocyanates which may be employed include polyisocyanurate of toluene diisocyanate, polymethylene polyphenyl isocyanate, polyisocyanate prepolymers of the aromatic type, toluene diisocyanate-based adducts, aromatic/aliphatic polyisocyanates, and polyfunctional aliphatic isocyanates.

METALLIC OXIDE OR HYDROXIDE (C) (2)

The metallic oxide or hydroxide (C) (2) according to the present invention is selected from the group consisting of calcium and magnesium oxides and hydroxides and is employed in an amount sufficient to react with at least thirty percent but not more than seventy-five percent of the carboxyl groups present in the reaction. The choice of metallic oxide or hydroxide is a matter of individual preference, and depends upon the particular combination of polyester resins used and the exact manufacturing process employed for producing articles of the molding composition, as is well known to those skilled in the art.

ALIPHATICALLY-UNSATURATED MONOMER (D)

In accordance with the present invention, the reaction product, unsaturated resins (A) and (B), is mixed with (D) a co-polymerization aliphatically-unsaturated monomer. The aliphatically-unsaturated monomer (D) is ordinarily present in an amount to give 0.5 to 2.5 moles of monomer unsaturation per mole of unsaturation in resins (A) and (B). Styrene and vinyl toluene are preferred aliphatically-unsaturated monomers, although others may also be employed.

FREE RADICAL POLYMERIZATION CATALYST (E)

In accordance with the invention, the reaction product also contains therein a free radical polymerization catalyst (E). The catalyst (E) is preferably present in an amount of at least 0.1 part per 100 parts of total resins (A) and (B) plus monomer (D), the parts being by weight.

Such a free radical polymerization catalyst is added to the uncured composition so that, upon heating to the catalyst activation temperature, the addition type cross-linking polymerization reaction will commence between the polymerization monomer and the unsaturated polyester resins. Such catalyst is usually employed in an amount ranging from about 0.1 to 3.0 parts per 100 parts of total resins and monomer. As is well known in the art, a wide range of free radical generating polymerization catalyst are usable, such as lauroyl peroxide, benzoyl peroxide, ketone peroxides such as methyl ethyl ketone peroxide, cyclohexanone peroxide, methyl isobutyl ketone peroxide, and others including dicumyl peroxide 2, 2-bis 4, 4-ditertiary butyl peroxy cyclohexyl propane, ditertiary butyl peroxide, cumene hydroperoxide, tertiary butyl cumyl peroxide and tertiary butyl perbenzoate.

INTERNAL MOLD RELEASE AGENT (F)

Internal mold release agents (F) such as zinc stearate, calcium stearate, magnesium stearate, organic phosphate esters, and other organic liquid internal mold release agents may be employed, as is well known in the art.

REINFORCING FIBERS (G)

In the composition of the present invention, the fiber reinforcement may be present in an amount of about 5 to 25 weight percent for bulk molding compositions and about 10 to 70 weight percent for sheet molding compositions. The fiber employed is preferably fiberglass. The amount of reinforcing fiber is preferably about 25 to 70 weight percent for sheet molding compounds.

A wide variety of reinforcing fibers are available for use in forming bulk molding compounds and sheet molding compounds such as glass fibers, carbon fibers, sisal fibers, Kevlar fibers, asbestos fibers, cotton fibers, and fibers such as steel fibers and whiskers, boron fibers and whiskers, and graphite fibers and whiskers. In addition, a wide variety or organic fibers may be used. However, glass fibers are the most desirable fibers for most applications because of their low cost and high strength.

NON-REINFORCING FILLERS (H)

Fillers may be, if desired, and usually are added to the uncured composition to reduce overall material costs without sacrificing a significant degree of desirable physical properties in the final product or to impart specific properties to the molding compound. Many different types of fillers can be used, such as inorganic fillers, i.e., silicates, asbestos, calcium carbonate, mica, barytes, clay, diatomaceous earth, microballoons, microspheres silica, and Fullers earth; and organic fillers, such as wood flour, cork dust, cotton flock, wool felt, shreaded cornstalks and ground nut shells. For example, these fillers may be added in amounts ranging from about zero parts to one thousand parts by weight per one hundred parts of the total polyester resins. When used alone without reinforcing fiber, the filler is employed in an amount of about fifty to about eighty weight percent for bulk molding compositions.

THERMOPLASTIC LOW-SHRINK ADDITIVE (I)

The molding compositions of the invention may include a low-shrink additive (I) consisting essentially of a thermoplastic polymer, ordinarily added dissolved in styrene or other unsaturated monomer (D), said low shrink additive preferably being present in an amount of about ten to fifty-five parts by weight per one hundred parts of total resins (A) and (B). This low-shrink additive, when optionally employed, is generally added to the combination of the unsaturated polyester resins and the ethylenically unsaturated polymerizable liquid monomer, and may be in the form of a thermoplastic powder solubilized in part or all of the polymerizable liquid monomer employed. Such low-shrink thermoplastic based additives are described in U.S. Pat. No. 3,701,748 and the low-shrink technology is also described in British Pat. Nos. 1,201,087 and 1,201,088, the disclosures of which three patents are hereby incorporated by reference. Such incorporation of low-shrink additive technology is now well-established in the art, as also taught by the aforesaid U.S. Pat. No. 4,077,845. The disclosure of Kroekel U.S. Pat. No. 3,701,748 is of interest regarding useful polyester resins (A) and aliphatically-unsaturated monomers (D) but is particularly apt as far as its disclosure, of useful thermoplastic polymers or copolymers (G) which may be employed to obtain low-shrink characteristics, except that for purposes of the present invention it is not necessary that such thermoplastic polymer or copolymers (G) be of a nature which yields an optically heterogeneous cured composition.

POLYMERIZATION INHIBITOR

Inhibitors may be used such as those present in the commercial polyester resins so that an additional inhibitor may or may not be required. As is conventional, free radical catalysts are added to effect the cure.

EXAMPLE I

|     |                                            | Ingredient                              | General Amount (By Weight) | Preferred Amount (By Weight) |
| --- | ------------------------------------------ | --------------------------------------- | -------------------------- | ---------------------------- |
| (A) | *Faster-Reactive First Polyester Resin     | Resin (A) Budd 2040                     | 16.5 to 70                 | 38.0                         |
| (B) | *Slower-Reactive Second Polyester Resin    | Resin (B)                               | 16.5 to 70                 | 38.0                         |
| (I) | Thermoplastic Low-Shrink Additive          | Thermoplastic additive                  | 0 to 45                    | 24.0                         |
| (F) | Internal Mold Release Agent                | Zinc Stearate                           | 2 to 6                     | 3.0                          |
| (H) | Non-reinforcing fillers                    | Calcium Carbonate (filler)              | 150 to 200                 | 190                          |
| (C) | (1) Organic Polyisocyanate                 | Polyisocyanate (MDI)                    | 0.01 to 8                  | 1.0                          |
| (C) | (2) Metallic Oxide or Hydroxide            | Magnesium Hydroxide or Magnesium Oxide  | 1 or more                  | 2.0                          |
| (K) | Pigment                                    | Pigment Dispersion                      | 0 to 6                     | .3                           |
| (E) | Free Radical Polymerization Catalyst       | Polymerization Catalyst                 | 0.1 or more                | 1.5                          |
| (G) | Reinforcement Glass Fibers (based SMC molding compound) |                            | 10 to 70                   | 30                           |

Ratio*: Budd 2040/Budd 2030 = 30/70 to 70/30; preferred ratio 50/50

PHYSICAL PROPERTIES OF MOLDED PRODUCT

The subject sheet molding compositions are capable of molding articles having highly desirable surface quality which are about 25 percent more flexible when molded into panels. When thin panels are molded of approximately 0.040 inch thickness, they are able to be flexed substantially further than panels molded from conventional SMC before audible evidence of fiber pop or crack. This has been demonstrated graphically on a laboratory testing unit. Moldings made with the subject more flexible system have indicated equal or improved quality when compared with conventional SMC automotive parts. Products, which were previously molded, with some degree of surface problems, i.e., cracking or porosity, have consistently molded much better with better surface quality and uniformity using the subject flexible SMC.

In addition, it has been graphically demonstrated on a Dynatup High-Speed Impact Tester that the molded panels were able to absorb approximately 55 percent more energy at the breaking point over conventional grades of automotive SMC. Such flexible SMC moldings allow much more distortion before failure by cracking. Where dimensionally stable thermoset plastic parts are fitted to metal components in the automotive field, where the latter are not always dimensionally the same, the flexible plastic parts will provide more "give" before reaching their breaking point, therefore, allowing a closer fit to the mating metal component.

Also, the flexible SMC allows the molding of thinner walled panels. It is possible to reduce wall thickness by about 33⅓ percent such as from about 0.120 inch to 0.080 inch to attain very significant weight and cost savings while providing improved flexibility with the same wall thickness.

Various modifications may be resorted to within the spirit and scope of the appended claims.

I claim:

1. A maturated moldable thermosetting resin-containing composition for molding articles under pressure having a filler selected from the group consisting of (a) reinforcing fiber, (b) inert filler, and (c) a combination of both (a) and (b), dispersed therein, in which the curable resin binder comprises the reaction product, in intimate contact with said filler of
   A. a faster-reactive unsaturated first polyester resin having (1) a ratio of hydroxyl groups to carboxyl groups between about 5.7 to 0.8, and (2) an acid number of at least 18, and (3) an average molecular weight between about 800 and 5000, and (4) containing a minor amount of isophthalic acid, and
   B. a slower-reactive unsaturated second polyester resin having (1) a ratio of hydroxyl groups to carboxyl groups between about 5.7 to 0.8, and (2) an acid number of at least 8, and (3) an average molecular weight between about 800 and 5000, and (4) being essentially free of isophthalic acid, and
   C. (1) an organic polyisocyanate in an amount sufficient to react with at least thirty percent, but not more than one hundred five percent, of the hydroxyl groups present, and
   C. (2) a metallic oxide or hydroxide selected from the group consisting of calcium and magnesium oxides and hydroxides in an amount sufficient to react with at least thirty percent, but not more than seventy-five percent, of the carboxyl groups present, said reaction product containing dispersed therein
   D. an aliphatically-unsaturated monomer,
   E. a free radical polymerization catalyst,
   F. an internal mold release agent, and
   I. a thermoplastic low-shrink additive,
said resin binder comprising at least about eight weight percent of said composition.

2. The molding composition set forth in claim 1 including both (a) reinforcing fiber and (b) inert filler dispersed therein.

3. The molding composition set forth in claim 1 wherein said resin (A) has an acid number of about 18 to 27 and a gel time of about b 4 to 10 minutes.

4. The molding composition set forth in claim 1 wherein said resin (B) has an acid number ranging from about 8 to 17 and a gel time ranging from about 12 to 18 minutes.

5. The molding composition set forth in claim 1 wherein said resin (A) and said resin (B) range in amount from about 30–70 to 70–30 by weight percent of said resin binder.

6. The molding composition set forth in claim 1 wherein said resin (A) and said resin (B) are present in a ratio of about 50—50 weight percent of said resin binder.

7. The molding composition set forth in claim 1 wherein said reinforcing fiber is present in an amount of about five to twenty-five weight percent for bulk molding compositions.

8. The molding composition set forth in claim 1 wherein said reinforcing fiber is present in an amount of about ten to seventy weight percent.

9. The molding composition set forth in claim 1 wherein said reinforcing fiber is fiber glass.

10. The molding composition set forth in claim 1 wherein said inert filler is present in an amount of about fifty to eighty-five weight percent for bulk molding compositions.

11. The molding composition set forth in claim 1 wherein said inert filler is present in an amount ranging from about zero to fifty-five weight percent for sheet molding compositions.

12. The molding composition set forth in claim 1 wherein said polyisocyanate (C) (1) is 4,4-diphenyl methane diisocyanate (MDI).

13. The molding composition set forth in claim 1 wherein said metallic hydroxide (C) (2) is magnesium hydroxide.

14. The molding composition set forth in claim 1 wherein said metallic oxide (C) (2) is magnesium oxide.

15. The molding composition set forth in claim 1 wherein said polyisocyanate (C) (1) is a mixture of 4,4¹-diphenylmethane diisocyanate and its trifunctional cyclic adduct containing carbodiimide linkages.

16. The molding composition set forth in claim 1 wherein said composition includes a low-shrink additive (I) consisting essentially of a thermoplastic polymer which is soluble in monomer (D), said low shrink additive being present in an amount of about ten to eighty-five parts by weight per one hundred parts of total combined resins (A) and (B).

17. The molding composition set forth in claim 1 wherein the aliphatically-unsaturated monomer (D) is present in an amount to produce 0.5 to 2.5 moles of monomer unsaturation per mole of unsaturation in combined total resins (A) and (B).

18. The molding composition set forth in claim 17 wherein the monomer (D) is styrene.

19. The molding composition set forth in claim 1 wherein the catalyst (E) is present in an amount of at least 0.1 part per 100 parts of total combined resins (A) and (B), and monomer (D).

20. The molding composition set forth in claim 1 wherein said resin binder is present in an amount of at least ten weight percent of said composition.

21. The molding composition set forth in claim 1 wherein said polyisocyanate (C) (1) is present in an amount sufficient to react with between about thirty and ninety-five percent of the hydroxyl groups present and said metallic oxide or metallic hydroxide (C) (2) is present in an amount sufficient to react with between about thirty and seventy-five percent of the carboxyl groups present.

22. A molded product made by the application of heat and pressure to the molding composition of claim 1.

23. A molded product made by the application of heat and pressure to the molding composition of claim 5.

24. A molded product made by the application of heat and pressure to the molding composition of claim 6.

25. A molded product made by the application of heat and pressure to the molding composition of claim 10.

26. A molded product made by the application of heat and pressure to the molding composition of claim 16.

27. A molded product made by the application of heat and pressure to the molding composition of claim 17.

28. A molded product made by the application of heat and pressure to the molding composition of claim 21.

29. A maturated moldable thermosetting resin-containing composition for molding articles under heat and pressure having a filler selected from the group consisting of (a) reinforcing glass fibers, (b) an inorganic inert filler, and (c) a combination of both (a) and (b), dispersed therein, in which the curable resin binder comprises the reaction product, in intimate contact with said filler of (A) a faster-reactive acidified polymerizable mixture of
(1) a styrene solution of an unsaturated first polyester resin made from (a) glycols including diethylene glycol and propylene glycol, and (b) dicarboxylic acids or anhydrides including maleic anhydride, isophthalic acid and adipic acid, and (2) one-half of one percent of a styrene solution of the dimethacrylate of a Bisphenol-A diepoxy resin, the dimethacrylate being formed by reacting methacrylic acid with the diepoxy resin

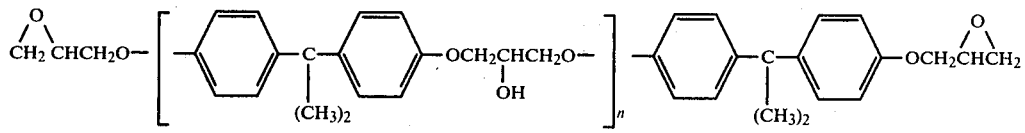

wherein n is greater than 0.2 and having an acid number of about 24, an average molecular weight of from about 1100 to 2200, and (B) a slower reactive acidified polymerizable mixture of a styrene solution of an unsaturated second polyester resin having the following constituents—1.11 moles maleic/fumaric acid, 0.64 moles adipic acid, and 1.93 moles propylene glycol, said second polyester resin comprising about 66 weight percent of said mixture and said styrene about 34 weight percent of said mixture, and having an acid number ranging from about 8 to 17, said second polyester resin having an average molecular weight ranging from about 800 to 1000, and (C) (1) an organic polyisocyanate in an amount sufficient to react with at least thirty percent, but not more than one hundred five percent of the hydroxyl groups present, and (C) (2) a metallic oxide or hydroxide selected from the group consisting of calcium and magnesium oxides and hydroxides in an amount sufficient to react with at least thirty percent, but not more than seventy-five percent, of the carboxyl groups present, said reactive product containing dispersed therein
(E) a free radical polymerization catalyst,
(F) an internal mold release agent, and
(I) a thermoplastic low shrink additive said resin binder comprising at least about eight weight percent of said composition.

* * * * *